United States Patent [19]

Schiel

[11] 4,359,829

[45] Nov. 23, 1982

[54] DRYING CYLINDER FOR PAPER MAKING MACHINE

[75] Inventor: Christian Schiel, Heidenheim, Fed. Rep. of Germany

[73] Assignee: J.M. Voith GmbH, Fed. Rep. of Germany

[21] Appl. No.: 208,786

[22] Filed: Nov. 20, 1980

[30] Foreign Application Priority Data

Nov. 30, 1979 [DE] Fed. Rep. of Germany ....... 2948203

[51] Int. Cl.³ .............................................. F26B 13/08
[52] U.S. Cl. ........................................ 34/124; 34/125;
34/119
[58] Field of Search .................. 34/125, 124, 119; 165/90

[56] References Cited

U.S. PATENT DOCUMENTS

| | | | |
|---|---|---|---|
| 2,297,094 | 9/1942 | Armstrong et al. | 34/124 |
| 3,241,251 | 3/1966 | Justus et al. | 34/124 |
| 3,299,531 | 1/1967 | Kutchera et al. | 34/125 |
| 3,659,349 | 5/1972 | Nykopp | 34/124 |
| 3,721,016 | 3/1973 | Lee et al. | 34/125 |

FOREIGN PATENT DOCUMENTS 2320519 3/1977 France ................................. 34/125

*Primary Examiner*—Larry I. Schwartz
*Attorney, Agent, or Firm*—Ostrolenk, Faber, Gerb & Soffen

[57] ABSTRACT

The disclosure concerns a drying cylinder for a paper making machine. The drying cylinder is hollow and is circumferentially grooved along the length of its inner surface. A plurality of collector conduits extend axially along the casing. Suction pipes project from each collector into respective ones of the grooves for sucking condensate therefrom. A siphon pipe is connected to each collector for siphoning off the collected condensate. The siphon pipe is insulated to reduce the temperature differential between the interior and exterior thereof. The suction pipes are shaped and/or spaced so that the suction pipes are able to remove a greater amount of condensate from the grooves in the vicinity of the siphon pipe than from the grooves in the remainder of the length of the casing, for attaining more uniform drying performance by the drying cylinder across the width of the web. For example, the suction pipes in the vicinity of the siphon pipe may have a greater diameter or there may be a greater concentration of suction pipes in that vicinity.

27 Claims, 4 Drawing Figures

DRYING CYLINDER FOR PAPER MAKING MACHINE

BACKGROUND OF THE INVENTION

The invention relates to a drying cylinder for a paper making machine, or the like, and more particularly to means for attaining uniform drying across the width of the web being dried.

The cylinder includes a casing which is grooved on its inner surface and includes a siphoning arrangement provided inside the cylinder for extracting condensate from the grooves in the casing.

The siphoning arrangement generally includes a number of elements, now described. At the points at which the condensation gathers, namely, at the peripheral grooves in the cylinder casing, small suction pipes are provided. These project into the peripheral grooves. Axially extending condensate collectors located inside the casing are connected to the many small suction pipes for receiving the condensate therefrom. The condensate collectors are, in turn, connected to siphon pipes which generally extend substantially radially of the casing. The siphon pipes, in turn, lead to an axially extending main condensate drainage line.

Despite numerous improvements in paper making machines, and in particular in the drying sections of the paper making machines, there has been a continuous problem that, viewed across its width, the paper web is unevenly damp (or unevenly dry). Particularly with large drying cylinders for producing lightweight crepe paper, the evenness of the drying over the whole length of the cylinder is decisive for the quality and quantity of the paper. Relatively small variations in the drying condition of the paper web produce very disadvantageous effects in its quality.

Improving the quality of paper produced in a paper making machine has been a prime concern of modern research in connection with paper making machines. The evenness of the drying profile of the paper web has been the subject of repeated research efforts. This research has been difficult since there are a number of sources of disturbance which cause a poor drying profile. The following possibilities should be noted. Moisture which is present at certain points in the paper web can be drawn in from the wet part. This may thus be attributed to faults in the head box of the paper making machine, for example, a bowed delivery lip, faults in the press section, faults in the wet felt web, blocked holes in a suction pressure roller, faults in the spraying pipes, etc. Furthermore, there may also be faulty operation of the hot air cowl. Cambering faults in a pressure roller may cause uneven drying. All these disturbance factors have been investigated and at least partially eliminated. Complete elimination of all drying irregularities has not been achieved up to the present time.

SUMMARY OF THE INVENTION

An object of this invention is to provide a drying cylinder for paper making machines, or the like, for producing in the paper web a more even drying profile than was previously obtainable.

A further object of the invention is to remove a greater amount of condensate from the region in the casing wherein the greater amount of condensate is likely to gather.

According to the invention, the drying cylinder is designed to adapt the drying performance in the vicinity of the siphon pipes, i.e., the pipes which extend radially from the outside of the casing inwardly, to the drying performance in the remaining area along the length of the cylinder casing.

The invention is based on the following realization. Until now, it has been supposed that the entire siphoning arrangement, with all its parts, uniformly removes the condensate from the individual grooves, provided that the geometric conditions are the same for all the small suction pipes in the grooves. The exchange of heat between the inner space in the cylinder and the siphoning arrangement has also been taken into account, but it has been established that very small amounts of heat are involved, measured against the total consumption of heat for drying. Furthermore, it has always been assumed that this exchange of heat is evenly distributed over the length of the cylinder, since the condensate collectors extend over the whole length of the cylinder.

However, the inventor realized that siphon pipes, which have relatively large diameters, "sweat" to a particularly high degree on their external surfaces. This may be attributed to the fact that, as a result of the pressure difference between the insides and the outsides of the siphon pipes, there is an increased temperature difference which leads to a particularly high amount of condensate of the vapor being deposited on the external surfaces of the individual siphon pipes. The increased condensate on the siphon pipes passes into those peripheral grooves in the cylinder casing which, viewed in a longitudinal section of the cylinder casing, are located in the vicinity of these large siphon pipes. As a result, the level of condensate in those few peripheral grooves is relatively high. This explains the lack of drying performance in this region of the cylinder, so that at this point, the web remains damp. This is manifested as "damp stripes" of the web.

There are numerous possibilities for realizing the measures for raising the drying performance at the location of the siphon pipes to a standard level. One of these possibilities comprises insulating the siphon pipes, which connect the collectors to the axial main condensate drainage line or to a hollow shaft, respectively, from the exchange of heat from the outside of the siphon pipes inwards, to thereby reduce the amount of condensation occurring in the form of sweating on the external surfaces of the siphon pipes. This amount of condensation is proportional to the coefficient of heat transmission of the pipe walls. With relatively little outlay, the coefficient of heat transfer of the siphon pipes can be reduced to from 1/10 to 1/100 of the level when the siphon pipes are uninsulated, so that the quantity of condensate deposited is reduced to technically insignificant amounts.

If further measures are used to ensure that no vapor condenses out in an uncontrolled manner in the remaining area of the cylinder, and to ensure that sufficient uniformity prevails over the length of the cylinder, then the same evenness of drying of the paper web is obtained over its width as would be obtained with a cylinder having a smooth internal wall. (A smooth wall cylinder has a lower drying capacity than a grooved wall cylinder). The higher drying capacity of the grooved cylinder can be fully exploited to increase paper production only after even drying has been achieved.

According to another feature of the invention, the siphon pipes are provided with insulating coverings on their external surfaces between the collectors, which extend along the axial dimension of the cylinder casing, and the axial drainage line. This is expedient since, with an insulating layer inside the pipe, there would be a risk of erosion of the layer due to the high flow speeds.

According to a further feature of the invention, the insulating covering is formed of a high-polymer material, such as rubber, polyamide or Teflon (trademark), in the form of tubes or glued-on fleece. The tube can be pressed and sealed against the pipe by using special devices at its two ends.

According to another preferred embodiment, the entire insulating covering on each siphon pipe is supported externally by a supporting casing which is preferably comprised of metal. This casing may be a solid wall or be perforated, or it may be made as spirals of round or flat material.

As a further embodiment of the invention, the siphon pipes are double-walled for defining an annular insulating space, which is sealed as hermetically as possible from the outside and from the inside. The insulating space preferably contains only gas, although it may also contain fluid substances such as oil or powdered or fibrous insulating material.

As mentioned above, the disturbance factors which are responsible for the occurrence of "damp stripes" in the paper web are numerous. Moreover, viewed across the width of the paper web, the disturbance factors are hard to localize. Although the "damp stripes" have specific positions across the width of the web, it cannot be determined from this which disturbance factors are causing the "under-drying". For example, two disturbance factors may be responsible for the same "damp stripe". It will thus be appreciated how hard it was for the inventor to pinpoint the further disturbance factor of the excessive formation of condensate on the siphon pipes.

Other objects and features of the invention will now be explained with reference to the accompanying drawings.

DESCRIPTION OF THE PREFERRED EMBODIMENTS

Figure 1:
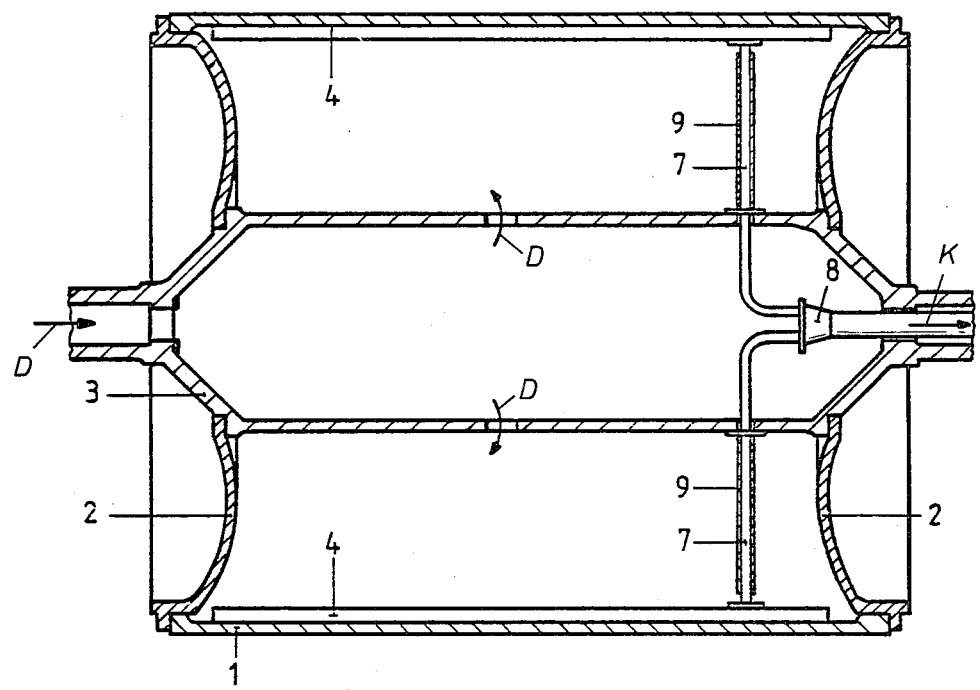
FIG. 1 shows an internally grooved drying cylinder in longitudinal section, which is provided with a first embodiment of the invention.

FIG. 1 shows a cylinder casing 1, which is supported by two opposite end caps 2 on a hollow shaft 3. Near to but spaced from the cylinder wall 1, there are a plurality of condensate collectors 4, in the form of closed tubular conduits, which are arrayed in spaced relationship annularly around the inside of and which extend axially over the length of the cylinder casing 1.

Figure 2:
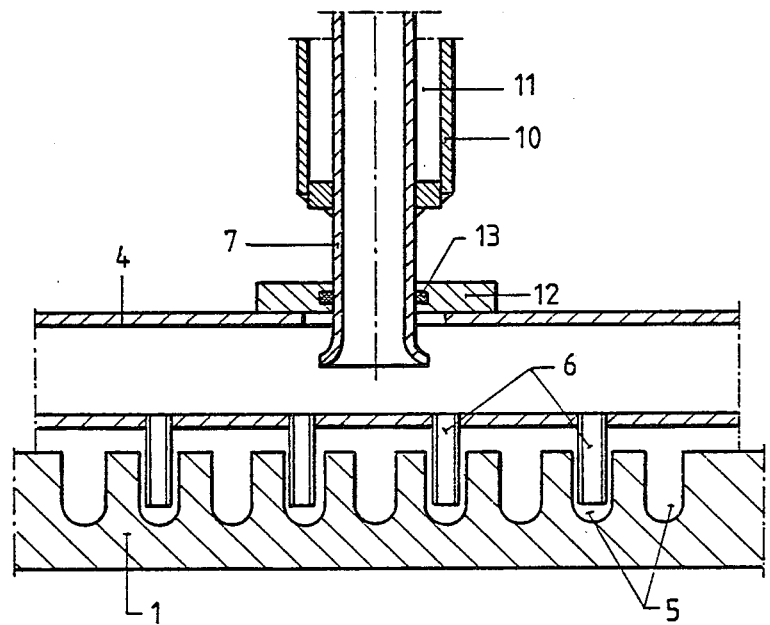
FIG. 2 shows an enlarged fragmentary detail of a cylinder like that in FIG. 1, but provided with a second embodiment of the invention.

In FIG. 2, the peripheral grooves in the cylinder wall of all of the embodiments and the small suction pipes projecting into the grooves can be seen. In FIG. 2, there are a plurality of annular peripheral grooves 5 defined in the interior wall in the cylinder casing 1. Small suction pipes 6 are inserted in some of the peripheral grooves 5.

The condensate collector 4 shown in FIG. 2 has a number of suction tubes 6 that are spaced apart such that one suction tube dips into only every second circumferential groove 5. The suction tubes of another condensate collector, not visible in FIG. 2, such as the next adjacent collector 4, are so arranged that they dip into the other circumferential grooves. In this way condensate is removed uniformly from all circumferential grooves.

In FIG. 1, the arrows D indicate the vapor flowing into the cylinder and the arrow K indicates the condensate leaving the cylinder.

The pipes 6 suck away the condensate and deliver it to the respective condensate collectors 4. From the collectors 4, the condensate passes through the respective radially inwardly directed siphon pipes 7 to the centrally located, axially extending condensate drainage line 8. Each siphon pipe 7 is passed into the respective collector 4 and the pipe 7 is longitudinally movable in a two-part clamping sleeve 12 with a sealing ring 13.

According to the embodiment of FIG. 1, the siphon pipes 7 have heat insulation 9 on their outer faces. In this way, there will not be a temperature differential between the inside and the outside of the pipe 7 that will cause condensation.

In the embodiment of FIG. 2, the siphon pipe 7 is enclosed by a second pipe 10. Between the two pipes 7 and 10, there is an insulating space 11 which can be filled, for example, with a gas. This insulates the pipe 7 for the above stated reasons.

Figure 3:
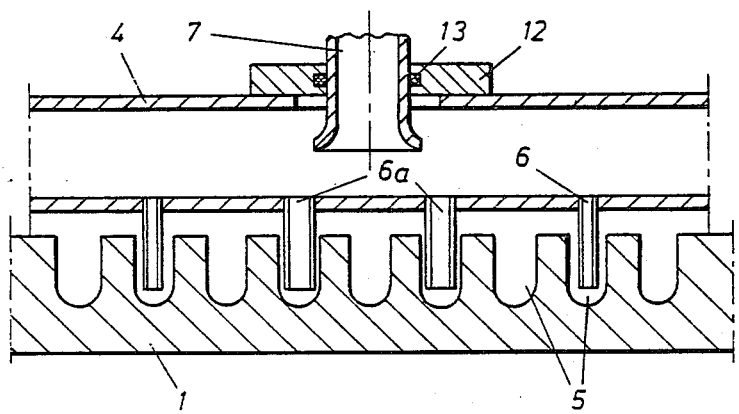
FIGS. 3 and 4 are fragmentary views of drying cylinders showing two other embodiments of the invention.
Figure 4:
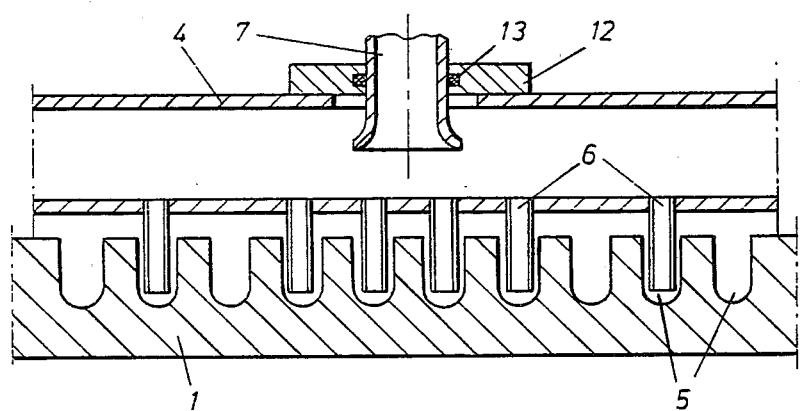

In FIGS. 1, 2 and 4, all suction pipes 6 have the same diameter. Referring to FIG. 3, in addition to or instead of the insulation 9 (or 10, 11), the suction pipes 6a present in the region of the siphon pipe 7 can have a larger diameter than the other suction pipes 6. As more condensate is generated near the siphon pipe 7, more condensate will also be drawn out of the grooves 5 near the siphon pipe 6 so that the same level of condensate is present in all grooves 5.

The same effect can be obtained with the embodiment of FIG. 4. Here the suction pipes have the same diameters. But, the number of suction pipes 6 in the vicinity of the siphon pipe 7 is greater than along the rest of the length of the cylindrical casing 1, whereby a greater quantity of condensate will be drawn out of the grooves 5 in the vicinity of the siphon pipe.

Although the present invention has been described in connection with the preferred embodiments thereof, many variations and modifications will now become apparent to those skilled in the art. It is preferred, therefore, that the present invention be limited not by the specific disclosure herein, but only by the appended claims.

What is claimed is:

1. A drying cylinder for a paper making machine, or the like, comprising:
    a hollow casing, including an external cylinder surface and an inner surface; the inner surface being shaped to define grooves therein and the grooves extending circumferentially around the inner surface;
    a vapor inlet to the casing; a siphoning arrangement for extracting condensate from the grooves, the arrangement comprising:
    at least one condensate collector located inside and extending axially of the casing; a siphon pipe connected to the condensate collector for drawing condensate out of the collector through the pipe;

the grooves being defined along the casing, both in the vicinity of the siphon pipe and in the region away from the siphon pipe;

thermal insulation means for the siphon pipe for reducing the exchange of heat between the outside and inside of the siphon pipe and for reducing deposition of condensate on the external surface of the siphon pipe;

a plurality of suction pipes at spaced intervals along the collector and communicating into the collector, and each suction pipe projecting into one of the grooves for suctioning condensate out of the grooves;

the presence of the thermal insulation on the siphon pipe and the shape and position of the suction pipes being such that the drying performance of the cylinder on a paper web, or the like, in the vicinity of the siphon pipe is adapted to the drying performance of the cylinder on a paper web, or the like, along the remainder of the length of the casing for avoiding damp stripes on the web in the vicinity of the siphon pipe.

2. The drying cylinder of claim 1, wherein there are a plurality of the collectors, and each having respective suction pipes.

3. The drying cylinder of claim 2, wherein there is a respective one of the siphon pipes for each of the collectors.

4. The drying cylinder of claim 3, wherein the siphon pipes extend radially of the casing.

5. The drying cylinder of claim 2, wherein the condensate collectors all extend parallel to the axis of the casing.

6. The drying cylinder of claim 1, wherein there are a plurality of the collectors, each having respective suction pipes; and in which there are a plurality of siphon pipes a respective one of the siphon pipes being provided for each of the collectors.

7. The drying cylinder of claim 6, wherein the siphon pipes extend radially of the casing.

8. The drying cylinder of claim 1, wherein the suction pipes are spaced apart along the collector to project into fewer than all of the grooves.

9. The drying cylinder of claim 8, wherein there are a plurality of the collectors, and each having respective suction pipes.

10. The drying cylinder of claim 9, wherein the collectors are located radially near to the inner surface of the casing.

11. The drying cylinder of claim 9, wherein the suction pipes of different ones of the collectors project into different ones of the grooves, such that the grooves into which the suction pipes of one collector do not project have the suction pipes of another of the collectors projecting into them.

12. The drying cylinder of claim 1, wherein the siphon pipes extend radially of the casing.

13. The drying cylinder of claim 1, wherein the collectors are located radially near to the inner surface of the casing.

14. A drying cylinder for a paper making machine, or the like, comprising:

a hollow casing, including an external cylinder surface and an inner surface; the inner surface being shaped to define grooves therein;

condensate removal means for extracting condensate from the grooves, the removal means comprising:

at least one condensate collector located inside and extending axially of the casing;

a siphon pipe connected to the condensate collector for draining condensate out of the collector and a plurality of suction pipes at spaced intervals along the siphon pipe connected to the condensate collector for drawing condensate out of the grooves;

the suction pipes having a size, shape and position for reducing the quantity of condensate which is accumulated in those of the grooves defined in a first region of the inner surface in the vicinity of the siphon pipe at a first rate and for removing the condensate which is accumulated in those of the grooves defined in a second region removed from the first region at a second rate so that the condensate remaining in those grooves defined in the first region has substantially the equivalent effect on drying as the condensate remaining in those grooves defined in the second region.

15. The drying cylinder of either of claims 1 or 14, wherein the suction pipes are adapted to draw off a greater amount of condensate from the grooves in the vicinity of the siphon pipe, than the suction pipes draw off from the grooves in the region of the casing away from the siphon pipe therein.

16. The drying cylinder of claim 15, wherein the suction pipes in the vicinity of the siphon pipe have a larger diameter than the other suction pipes in the region of the casing away from the siphon pipe.

17. The drying cylinder of claim 15, wherein there is a greater concentration of the suction pipes in the vicinity of the siphon pipe than in the region of the casing away from the siphon pipe.

18. The drying cylinder of either of claims 8 or 14, wherein there is a greater concentration of the suction pipes in the vicinity of the siphon pipe than in the region of the casing away from the siphon pipe.

19. The drying cylinder of claim 18, wherein in the vicinity of the siphon pipe, the suction pipes project into more closely spaced apart grooves than in the region of the casing away from the siphon pipe.

20. The drying cylinder of claim 14, wherein the grooves extend circumferentially around the inner surface of the casing.

21. The drying cylinder of claim 20, wherein the siphon pipes extend radially of the casing.

22. The drying cylinder of claim 20, wherein the collectors are located radially near to the inner surface of the casing.

23. The drying cylinder of claim 14, in which the first rate is higher than the second rate.

24. The drying cylinder of claim 14, in which the first region and the second region extend circumferentially around the inner surface of the casing.

25. The drying cylinder of claim 14, wherein the condensate removal means further comprises thermal insulation means for the pipe for reducing the exchange of heat between the outside and inside of the siphon pipe.

26. The drying cylinder of claim 1 or claim 25 in which the thermal insulation means is a layer disposed around the outside of the siphon pipe.

27. The drying cylinder of claim 1 or claim 14 further comprising means for introducing vapor which forms condensate into the casing.

* * * * *